Nov. 2, 1954     C. BERSTECHER     2,693,066
PORTABLE DEVICE FOR ENCIRCLING MACHINING OF WORK
Filed Oct. 14, 1950     4 Sheets-Sheet 1

INVENTOR
CARL BERSTECHER
ATTORNEY

Nov. 2, 1954 C. BERSTECHER 2,693,066
PORTABLE DEVICE FOR ENCIRCLING MACHINING OF WORK
Filed Oct. 14, 1950 4 Sheets-Sheet 3

INVENTOR
CARL BERSTECHER
By
ATTORNEY

United States Patent Office 2,693,066
Patented Nov. 2, 1954

2,693,066

PORTABLE DEVICE FOR ENCIRCLING MACHINING OF WORK

Carl Berstecher, Ravensburg, Germany

Application October 14, 1950, Serial No. 190,082

12 Claims. (Cl. 51—254)

This invention relates to a device for machining such as fine-grinding or honing, of outer or inner cylindrical surfaces, particularly of large surfaces.

One of the objects of the present invention is to provide a novel and improved device of the general type, above referred to, which permits to machine, for instance to fine-grind or hone, in an economical manner inner or outer surfaces of large and unwieldly work pieces, such as rolls used in the paper and sheet metal art.

Another object of the invention is to provide a novel and improved device of the general type, above referred to, which eliminates the need of large, expensive and space consuming machine tools, as hitherto used for this purpose.

Still another object of the invention is to provide a novel and improved device of the general type, above referred to, which greatly simplifies the working of pieces having large surfaces by mounting the work piece stationarily and moving the tools, such as grind stones, over the surfaces to be worked.

Another more specific object, allied with the preceding one, is to control the transport and the centering of the tools by the surfaces proper.

A still more specific object of the invention is to provide means permitting the convenient working of cylindrical surfaces positioned closely adjacent to flanges and other projections extending from the surfaces.

Other and further objects, features and advantages of the invention will be pointed out hereinafter and set forth in the appended claims forming part of the application.

In the accompanying drawing several now preferred embodiments of the invention are shown by way of illustration and not by way of limitation.

Figure 1:
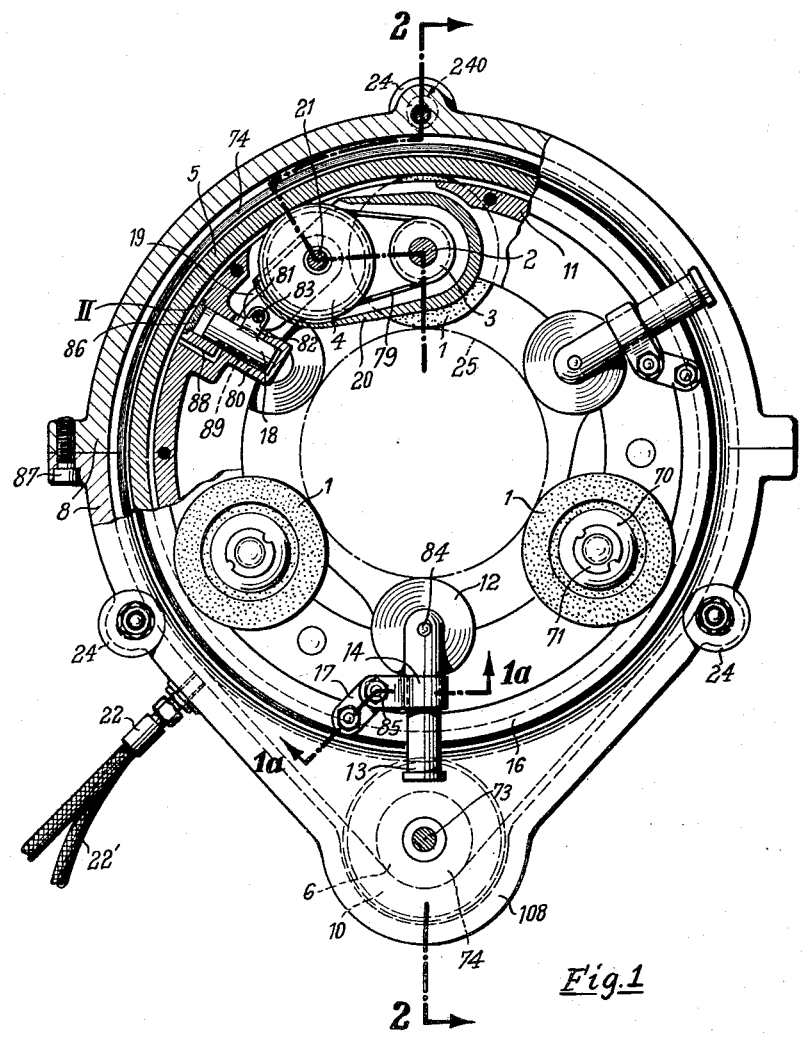
Fig. 1 shows on the right hand side an elevational front view, seen in axial direction, of a device according to the invention and on the left hand side a sectional view taken on line 1—1 of Fig. 2.
Figure 2:
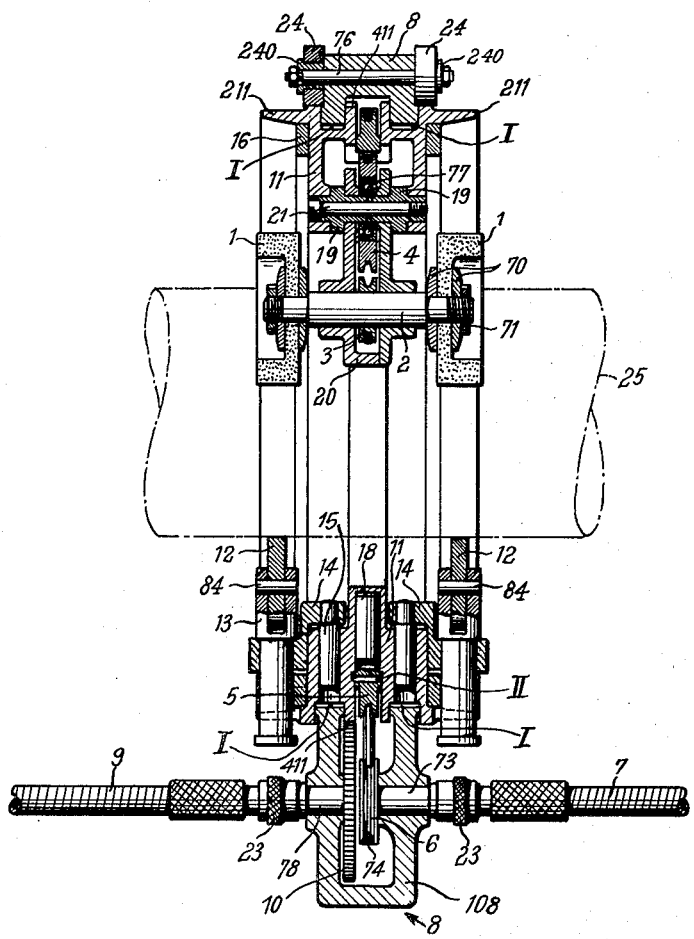
Fig. 2 is a section taken on line 2—2 of Fig. 1.

Referring to Figs. 1 and 2 the device comprises a stationary housing 8 of a substantially cylindrical outer surface, having an extension 108 integral with the lower half of outer casing 8. The outer casing 8 consists of two parts, a lower half and an upper half, clamped together by screws 87 as shown in Fig. 1. The housing 8 has a large circular opening and an annular groove on the inside, the cross-section being thus U-shaped all around and adapted to receive various parts of the device. Rotatably mounted in the right side wall of the extension 108 is a shaft 73 whose outside end is connected to a flexible driving shaft 7 by means of a quick action coupling 23. The other end of the shaft 73 carries a V-belt pulley 6 keyed to said shaft, which drives through a V-belt 74 an annular friction pulley 5 having a V-groove on the outside and a cylindrical inner surface and being guided between side walls of annular members 11 the shape and function of which will be described below. A V-belt pulley 4 mounted on shaft 21 is held in frictional contact with the inner cylindrical surface of said annular friction pulley 5 by means of its outer annular edges and drives, by means of V-belt 79, another V-belt pulley 3 mounted on shaft 2 which also carries the grinding wheels 1 arranged on both sides of pulley 3. Provided on either side of each grinding wheel 1 are the holding discs 70, the wheel and the discs being forced against a shoulder of shaft 2 by a clamping nut 71 screwed on the outside threaded portion of shaft 2. The mounting of the annular pulley 5 and of the shafts 21 and 2 will be explained below. In the application shown in Figs. 1 and 2, three of such pairs of grinding wheels 1 are arranged on the surface of the work 25, the wheels being spaced 120° apart.

On either side of the stationary casing 8 an annular member 11 is arranged which embraces with its ring groove a side wall of the casing 8, so that the members 11 are guided in radial direction by the sides of said casing 8 with lateral motion being eliminated. The manner in which the members 11 are divided or clamped together respectively is not apparent from the drawing. On the outside two cylindrical extensions 211 are provided which bear against guiding rolls 24 rotatably arranged on either side of the housing 8 on shaft 76 extending through the casing 8. Between the rolls 24 and the shaft 76 eccentric bushings 240 are provided as may be seen from Fig. 2 with the result that turning of these bushings 240 will adjust the rolls 24 in radial direction. In the application shown in Figs. 1 and 2 three pairs of rolls 24 are arranged on the surface of the cylindrical extensions 211. After setting the rolls 24 properly the bushings 240 are clamped in position by nuts bearing on washers as shown in Fig. 2. Through their ring grooves and the rolls 24 the annular members 11 are guided in axial and radial directions, with the result that said members 11 are adapted to rotate about the longitudinal axis of the work 25 by means which will be described later. On these bilateral members 11 are mounted the shafts 21 of the V-belt pulleys 4. These shafts 21 carry a double link 19 whose function will be presently described, said links having on one end an outer cylindrical bushing fitting over the shaft 21 into holes provided in the members 11 and an inner cylindrical bushing on which a sectional casing 20 is arranged, the latter having two parallel lateral walls and being entirely closed except for an opening necessary for allowing V-belt pulley 4 to come into frictional contact with annular pulley 5 as shown in Fig. 1. Mounted on the inner cylindrical bushing of links 19 is a ball bearing 77, the bearing being thus located between the walls of casing 20 and its outer ring being secured to the V-belt pulley 4. The shaft 2, to which the V-belt pulley 3 is keyed is carried by the side walls of casing 20, the latter having an extension on either side for properly holding the shaft.

The rotatably mounted annular member 11 are driven through a flexible shaft 9 coupled to the shaft 78 by means of a coupling 23, said shaft being mounted on the left side wall of extension 108 of outer casing 8. On the free end of shaft 78 extending into the inside space of outer casing 8 is fastened a toothed wheel or gear 10 meshing with the toothed surface of an outer collar 411 of member 11 whereby the members 11 are adapted to be rotated when the flexible shaft 9 revolves.

The operation of the device as far as revolving parts are concerned will now be explained.

The flexible shaft 7 drives, through coupling 23, the shaft 73 on which the V-belt pulley 6 is rigidly mounted. This small-sized pulley 6 in turn operates through V-belt 74 the annular friction pulley 5 which drives on its inner frictional surface the pulley 4, freely rotatable on ball bearing 77 arranged on the inner cylindrical bushing of links 19 which are rigidly connected to casing 20 by means of shaft 21. By means of V-belt 79, pulley 4 drives the V-belt pulley 3 and thereby the grinding wheels 1 both being rigidly secured to shaft 2. Thus the grinding wheels revolve upon operation of shaft 7.

In order to have the grinding wheels 1 revolve not only on their own axis but also in a planetary motion about the work 25, the flexible shaft 9 operates as explained before through coupling 23, shaft 78, and thus gear 10. This gear 10 rotates the annular members 11 by engaging the tooth collar 411 of member 11. As the member 11 carry the entire driving mechanisms of the grinding wheels 1, these mechanisms are revolving about the work 25 with the result that the grinding wheels carry out two rotary motions: First they revolve about their own axis and secondly they rotate in a planetary fashion about the work 25.

In order to achieve proper contact pressure of the grinding wheels on the surface of the work and in order to properly center and transport the work 25 a hydraulically controlled arrangement is provided which will now be described: One of the annular members 11 has hollow projections 80 extending towards the main axis, their number being equal to the number of pairs of grinding wheels. These projections have a radial cylindrical hole closed at the top by means of disc 86. An annular groove II is extending all the way around between a member 11 and annular pulley 5, for each cylindrical hole a channel 88 being provided which connects the annular space II with said cylindrical holes. Slidably arranged in the cylindrical holes are pistons 18 having a lateral lengthwise groove 89 into which channel 88 opens. Supply lines 22 and 22', fastened to the casing 8, supply oil or another suitable liquid through an opening in said casing, the annular space II, the channel 88, the grooves 89 to the pressure chamber below the piston 18, thus forcing the piston 18 outwardly in the cylindrical hole against the pressure of a spring not shown in the drawing, the spring being adapted to hold the piston in its innermost position when the hydraulic pressure is removed. The hollow projections 80 have lateral slots 81 extending in radial direction in which a lug 82 secured to the piston 18 is adapted to slide. The links 19 are pivoted with one end to said lug 82 by means of pin 83. The other ends of links 19 are connected to casing 20. As can best be seen in Fig. 2, the two links for each casing are separated by a narrow gap and have each a collar which collars straddle the outer walls of the respective casing. The bilateral members 11 are fitted upon cylindrical portions of the links protruding beyond said collars. The links are provided with cross-holes, the hole through the right hand link being threaded and the hole through the left hand link being recessed. Shaft 21 is threaded into the link holes thereby joining the links to the casing the walls of which encompass ball bearing 77.

The operation of this contact pressure arrangement will now be described. When no pressure is applied through oil lines 22 and 22' piston 18 is forced inwardly into its lowermost position by a spring not shown. The links 19 and thus the casing 20 is then swung outwardly together with the grinding wheels 1, the latter thus clearing the work. When pressure is applied through oil lines 22 and 22', the piston 18 is forced outwardly thus swinging links 19, casing 20 and grinding wheels 1 towards the work, with the result that the grinding wheels 1 bear on the surface of the work 25. The contact pressure of the grinding wheels 1 is controlled by the pressure of the oil. As the piston 18 is adapted to travel only over a short distance, it will be necessary to roughly adjust the grinding wheels 1 corresponding to the diameter of the work 25. This is accomplished by loosening the respective shaft 21 and swivelling casing 20 and thus the grinding wheels into the desired position, following which the shaft 21 is retightened so that links 19 and casing 20 are again rigidly clamped in position.

Figure 1A:
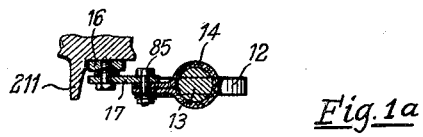
Fig. 1a is a section taken on line 1a—1a of Fig. 1.

In order to hold the work in the desired central position and to transport the device or the work, a plurality of pairs of centering rolls 12, preferably three pairs, are provided, which can freely rotate on the pins 84 mounted in the carriers 13, which are slotted on one end to receive the guiding rolls 12 and have a cylindrical body adapted to be radially adjusted in links 14 fastened to links 17 by means of screws 85. By tightening this screw 85 link 14 is clamped in position on the cylindrical portion of the carriers 13. Pin-connected to screw 85 is a second link 17 also pin-connected to the ring 16, which is located on the outside of the members 11 as shown in Figs. 1a and 2.

The centering rolls 12 may be adjusted as follows: Upon loosening screws 85 the carriers 13 together with the centering rolls 12 are freely radially movable and are also swivelable about the axis of the carriers 13, with the result that the centering rolls 12 may be set according to any diameter of the work and may be turned into a position so that the axis of the pin 84 is arranged at an angle with the axis of the work 25. The centering rolls 12 are then no longer at right angles to the axis of the work. By tightening the screws 85 the links 14 are secured on the carriers 13 in a suitable position. The ring 16 serves uniformly to advance all centering rolls of one side in circumferential direction with respect to the workpiece, the links 17 being pin-connected to the ring 16 and the link 14.

As shown in Fig. 2 links 14 have an extension on the inside to which pistons 15 are secured, the latter being adapted to slide up and down in a cylindrical hole open on both sides and arranged on either side of the hollow extension 80 of a member 11. The annular spaces I which are connected with each other by external means (not shown in the figures) are adapted to be filled with oil or another suitable liquid through a supply line 22' (behind supply line 22 in the drawing). By controlling the pressure a radial movement of the pistons 15 is effected, the latter moving inwardly against the pressure of a spring, not shown in the figures, together with the member 14. The carriers 13 and centering rolls 12 bear on the surface of the work 25, the pressure being equal and applied from three pairs of rolls in three radial directions, offset by an angle of 120°. As the travel of the pistons 15 is limited, it is necessary to adjust the rolls 12 roughly according to the diameter of the work by shifting the carriers 13 in radial direction as described in detail above.

When the rolls are set at right angles to the axis of the work the device revolves around the stationary work, with the result that only certain parts of the surface are ground. In order to achieve a cylindrical finely ground surface it is necessary to have the work move axially during the grinding process. This is accomplished by setting the rolls 12 at angle other than 90° to the axis of the work. The rolls will then impart a longitudinal motion to the device or the work, the rolls moving along a helical path on the surface of the work. The direction of the longitudinal travel may be reversed by reversing the direction of rotating of shaft 9 and thus of the number.

Figure 3:
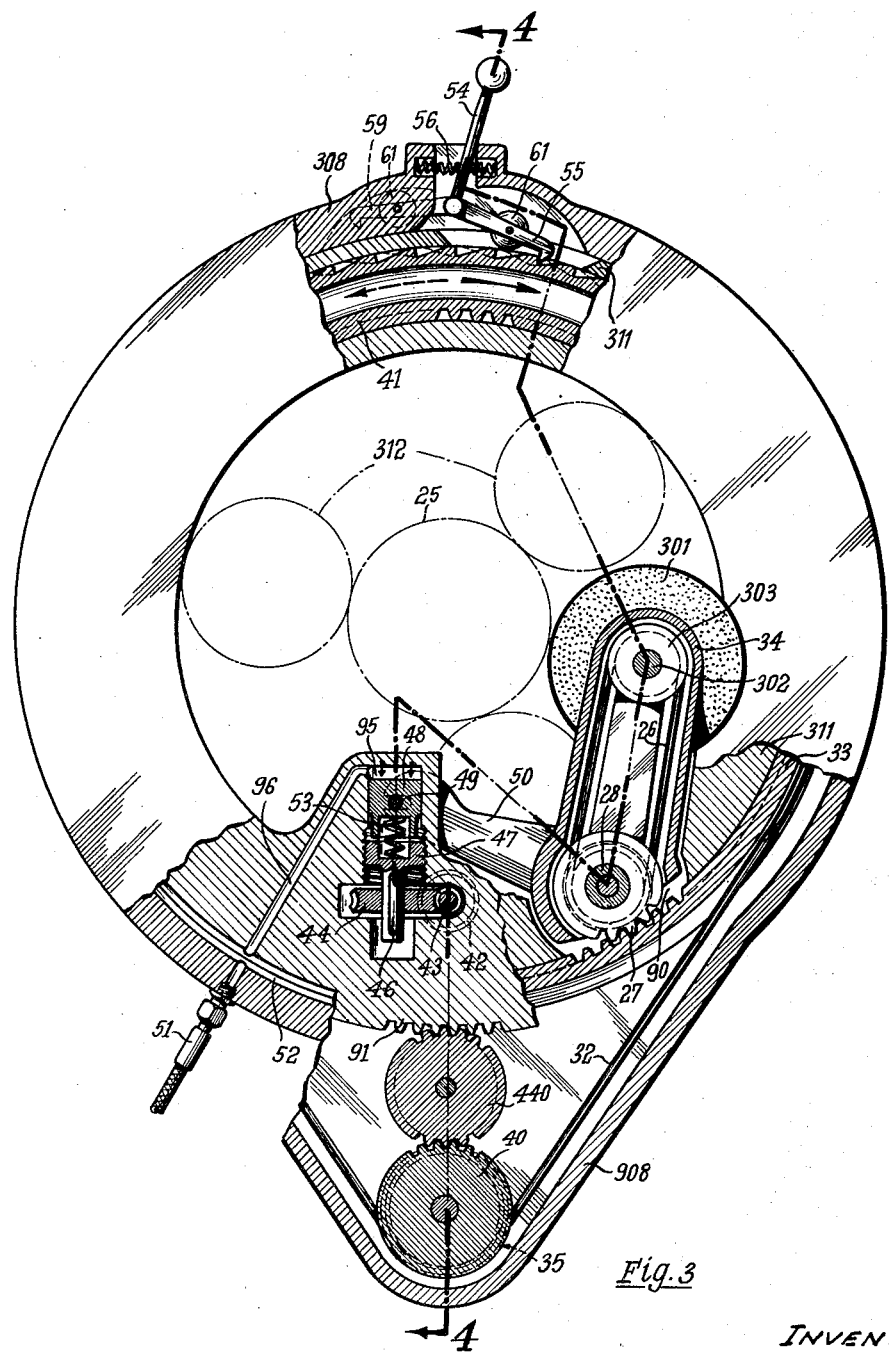
Fig. 3 is an elevational view, partly in section and seen in axial direction, of a modification of a device according to the invention.
Figure 4:
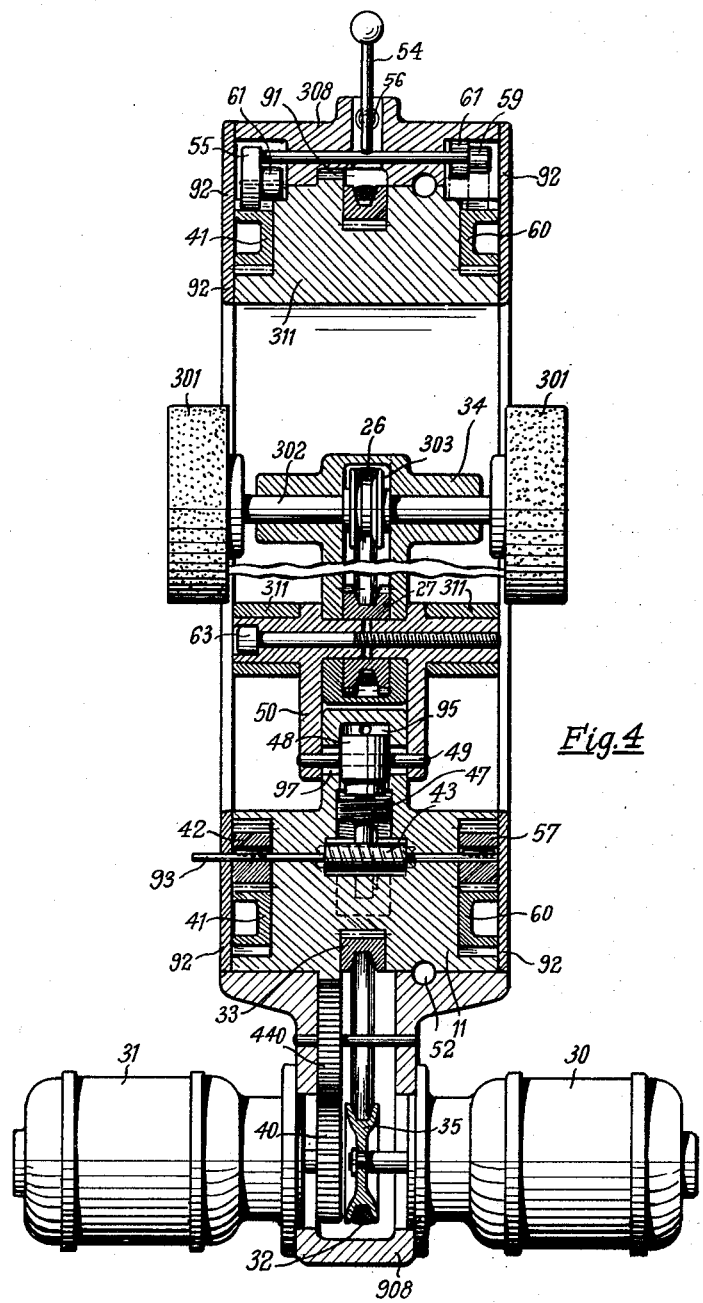
Fig. 4 is a section taken on line 4—4 of Fig. 3.

In Figs. 3 and 4 another embodiment of the invention is illustrated, the general arrangement being similar to that shown in Figs. 1 and 2. A stationary outer casing 308 with a cylindrical opening is provided with an extension 908 in which the V-belt pulley 35 is revolvably mounted, the latter being driven by an electric flange motor 30. The V-belt pulley 35 rotates, by means of V-belt 32, the annular pulley 33, which has a V-type ring groove on the outside and carries teeth on the inside, said pulley 33 being adapted to slide between the lateral sides of a ring groove of an annular member 311, the function of which will be described below. The member 311 has recesses 90 of a number corresponding to the number of pairs of grinding wheels, said recesses being laterally enclosed by the side walls of the annular member 311. Mounted in each recess 90 is a toothed pulley 27 which is adapted to rotate on inner cylindrical bushings of the links 50 arranged on either side of the toothed pulley 27. Outer cylindrical bushings of said links 50 are revolvably mounted in holes provided in the side walls of the recess 90. The toothed pulley 27 is meshing with the teeth of the annular pulley 33 and drives by means of a V-belt 26 a V-belt pulley 303 mounted in casing 34 which also encloses the toothed pulley 27. As illustrated in Fig. 4 the inner bushings of links 50 extend into the interior of the casing 34, two lateral holes being provided in said casing for that purpose. A partly threaded pin 63 holds the whole arrangement tightly together with the result that links 50 and casing 34 are rigidly clamped together. The V-belt pulley 303 is secured to shaft 302 revolvably mounted in the casing 34, which has on the outside two substantial extensions, cast integral with the casing, for properly carrying said shaft 302. Fastened to the outside ends of the shaft 302 are the grinding wheels 301 by means not shown in detail on the drawings.

From the foregoing it is evident that the electric motor 30 drives the V-belt pulley 35 which in turn operates the annular pulley 33 by means of the V-belt 32. The annular pulley meshes with its inside teeth with toothed pulley 27 which operates, by means of its V-belt 26, the V-belt pulley 303 and thus the grinding wheels 301.

In order to rotate the grinding wheels 301 in a planetary motion about work 25, a second electric flange motor 31 is provided on the left side which is fastened to the outside of extension 908. The motor shaft carries a toothed gear 40 meshing with an intermediate toothed gear 440, the latter being engaged with the outside teeth 91 of an annular outer collar of member 311 which is thus rotated together with the grinding wheel arrangements about the axis of the work 25.

Provided is also an arrangement for adjusting the grinding wheels during the grinding operation and to produce the necessary contact pressure of the grinding wheels 301 on the surface of the work, which will now be described.

Arranged in annular grooves on the outside of members 311 are ring gears 41 and 60 respectively on either side of the member, said gears having ratchet teeth on the outside and gear teeth on the inside. A lever 54 is adapted to operate through a shaft two pawls 55 and 59 which may engage the ratchet teeth of gears 41 or 60. Guide rolls 61 which also engage into the ratchet teeth, force the pawl out of engagement after a short travel and the double type spring 56 may then move the lever 54 into its central position where both pawls are disengaged. This arrangement thus results in the ring gears 41 or 60 respectively being stopped for short angular motions only. The reason for this comparatively short motion will be explained below. The ring gears 41 and 61 are covered up by annular plates 92 fastened to member 311 by screws not shown in the figures. Engaged with ring gears 41 and 60 are the gears 42 and 57 respectively which rotate about their own axis when the ring gears 41 and 60 are held stationary by the respective pawl, as the member 311 rotates together with these gears 42 and 57. The gears 42 and 57 are secured to a shaft 93 on which a worm 43 is rigidly mounted, this worm meshing with worm wheel 44. The worm wheel is slidably arranged on shaft 46, the wheel having a longitudinal groove along which a key, held in shaft 46 is adapted to slide. Secured to the inner end of the shaft 46 is an annular stop 47 having a threaded portion adapted to be screwed in a substantially radial direction by means of its outer thread in a partly threaded cylindrical hole provided in member 311. Slidably arranged in that cylindrical hole is a piston 46 which is moved inwardly toward the center of the workpiece by the action of a spring 53. On the side of the piston 48 opposite to spring 53, there is a cylindrical pressure space 95 into which oil or any other suitable liquid may be forced under pressure through line 51, ring groove 52, and channel 96. The piston carries a pin 49 adapted to move in substantially radial direction within slot 97 of member 311. Secured to the outer ends of pin 49 are the links 50 which are adapted to turn in holes provided in member 311 on their outside bushings as shown in Fig. 4.

It will now be explained in detail how the grinding wheels 301 are advanced towards the work or retracted therefrom respectively. When no pressure is exerted on piston 48 the spring 53 forces the piston towards the bottom side of cylinder 95, thus swinging the brackets 50 in clock wise direction. This motion rotates the entire casing 34 in the same direction, whereby the grinding wheels 301 are lifted off the work 25 in substantially radial direction. When pressure is applied to the piston 48 by means of pressure oil entering through line 51, ring groove 52, and channel 96 into the cylindrical pressure space 95 and during this motion swings the brackets 50 and the grinding wheels 301 through a corresponding angle. When the pawl 55 is engaged the gear 41 is stopped, whereupon gear 42 rotating together with member 311 is revolving about its own axis and by doing so rotates the worm 43 and through the worm the worm wheel 44. The stop member 47 then revolves together with the shaft 46 slidably arranged in the worm wheel so that the stop member 47 by reason of its threaded engagement with the threaded cylindrical hole is moved into a radially outward direction. The piston 48 is forced by the pressure in the pressure space 95 against the annular stop 47 and will thus follow the motion of said stop. The movement of the piston 48 swings, in a similar fashion as described above, through the brackets 50, the casing 34 and thus the grinding wheels 301 in a substantially radial direction towards the main axis. In order to avoid that the wheels 301 are inadvertently advanced for too great a distance the guide rolls 61 disengage as described before the pawls after a certain length of engagement, releasing thereby the gears 41 and 60 respectively and stopping the advance of the grinding wheels 301.

In addition three pairs of centering rolls 312 for the work 25 are provided, the centering rolls being indicated in dot-dash lines in Fig. 3. The arrangement and operation may be similar to that described in connection with Figs. 1 and 2 and is not illustrated in Figs. 3 and 4.

Coarse adjustment of the grinding wheels is also similar to that described in connection with the embodiment shown in Figs. 1 and 2.

If it be desired to adjust the wheels 301 in both directions, i. e. towards and away from work 25, the gears 42 and 57 must be turned in opposite directions, when the respective ring gears 41 and 60 are stopped. To this end it is necessary to provide an intermediate gear, e. g. between gear 57 and ring gear 60. This intermediate gear is not shown in the drawing.

It is to be understood that the invention is not limited to grinding wheels, any suitable abrasing wheel being usable like for instance one made from honing stone.

While the invention has been described in detail with respect to certain now preferred examples and embodiments of the invention it will be understood by those skilled in the art after understanding the invention that various changes and modifications may be made without departing from the spirit and scope of the invention and it is intended, therefore, to cover all such changes and modifications in the appended claims.

What is claimed as new and desired to be secured by Letters Patent is:

1. A device for machining a cylindrical surface of a stationarily supported workpiece, the said device comprising in combination a generally annular housing, a ring member rotatably mounted within said housing coaxially therewith, a plurality of rotary tool means, a corresponding plurality of support means mounted on and within said ring member in circumferential spacing and supporting said tool means, common adjustment means operatively coupled with each of said tool means for joint radial adjustment of the latter relative to the center of said ring member, a plurality of centering rollers, a corresponding plurality of support means mounted on said ring member in circumferential spacing and supporting said centering rollers, the said rollers being disposed alternating with said tool means, common adjustment means operatively coupled with each of said centering rollers for joint radial adjustment thereof relative to the center of said ring member, the said tool means and the said centering rollers being engageable in a machining and centering engagement respectively with a workpiece disposed coaxially with said ring member and extending therethrough, drive means operatively coupled with said tool means for rotating the same about their respective axes, and drive means operatively coupled with said ring member for rotating the same and the means mounted thereon thereby revolving the tool means and the centering rollers about the circumference of a workpiece extending through said ring member coaxial therewith.

2. A device as defined in claim 1, wherein said support means for the rollers are arranged to provide for setting said rollers at a selected angle relative to a radial plane of the cylindrical surface of a workpiece to be machined, thereby effecting an axial displacement of the device in response to a rotation of the ring members and the rollers about the axis of the workpiece.

3. A device as defined in claim 1, wherein said radially adjustable support means for the tool means include relatively movable adjustment means position controlled by fluid under pressure.

4. A device as defined in claim 1, wherein said common adjustment means for the tool means comprise a movable common control member for interconnecting all said tool means for simultaneous adjustment of the tool means, and wherein actuating means are operatively connected with said control member for movement of the same, said actuating means being mounted on said device in a position accessibly from the outside thereof.

5. A device as defined in claim 4, wherein control lever means operatively connect each tool means with said control member for simultaneous adjustment of all the tools in response to a movement of said control member.

6. A device as defined in claim 5, wherein said control member comprises an externally toothed ring mounted rotatably about and coaxially with the axis of said ring member.

7. A device as defined in claim 6, in combination with stationarily supported ratchet means engageable with said toothed ring for effecting a limited rotation of said ring, thereby uniformly varying the positions of said tool means relatively to a cylindrical surface of a workpiece.

8. A device as defined in claim 7, wherein said ratchet means are double-acting for rotation of said ring in either direction depending upon the rotational direction of said tools about a cylindrical surface.

9. A device as defined in claim 4, wherein a control lever is connected with each tool means for adjustment of the respective tool means by the lever position, and wherein a fluid controlled adjustment means connects each lever with the control member, movement of the said member affecting the position of all the said adjustment means and, hence, of the tool means.

10. A device as defined in claim 9, wherein each of said fluid controlled adjustment means includes a cylinder adapted to be filled with fluid and a piston element slidable in the cylinder and operatively connected with the respective tool means, said piston element being connected with the control member for controlling the position of each piston element by the position of the control member, the position of each piston element controlling the position of the respective tool means.

11. A device for machining a cylindrical surface of a stationarily supported workpiece, the said device comprising rotatably mounted annular support means, a plurality of centering rollers rotatably and radially adjustably mounted on said support means and engageable with the cylindrical surface of a workpiece to be machined for centering the said workpiece to be machined coaxially with the axis of the annular support means, a plurality of rotatable tool means radially adjustably mounted on said annular support means substantially in the same radial plane therewith and positioned for engagement with the cylindrical surface of a workpiece centered by the said centering rollers, first common adjustment means operatively coupled with the mounting means of each centering roller for joint radial adjustment of all the rollers, second common adjustment means operatively coupled with the mounting means of each of the tool means for joint radial adjustment of all the tool means, drive means operatively coupled with said annular support means for rotating the same together with the centering rollers and the tool means about the rotational axis of the said support means and also for rotating the centering rollers about their respective axes by engagement of the rollers with a cylindrical surface of a workpiece to be machined, and drive means operatively coupled with tool means for additionally rotating the same about their respective axes.

12. A device as defined in claimed 11, wherein the said centering rollers and the said tool means are circumferentially spaced on the annular support means and alternately disposed.

References Cited in the file of this patent

UNITED STATES PATENTS

| Number | Name | Date |
| --- | --- | --- |
| 1,017,898 | Muller | Feb. 20, 1912 |
| 1,099,556 | Lee | June 9, 1914 |
| 1,860,795 | Yerk | May 31, 1932 |
| 1,956,068 | Herzog | Apr. 24, 1934 |
| 2,086,492 | Ekholm | July 6, 1937 |
| 2,271,528 | Pfohl | Feb. 3, 1942 |
| 2,541,767 | Jones | Feb. 13, 1951 |
| 2,546,490 | Baldwin | Mar. 27, 1951 |

FOREIGN PATENTS

| Number | Country | Date |
| --- | --- | --- |
| 48,184 | Austria | May 26, 1911 |
| 218,552 | Germany | Feb. 5, 1910 |
| 233,629 | Switzerland | Nov. 1, 1944 |